Figure 1:
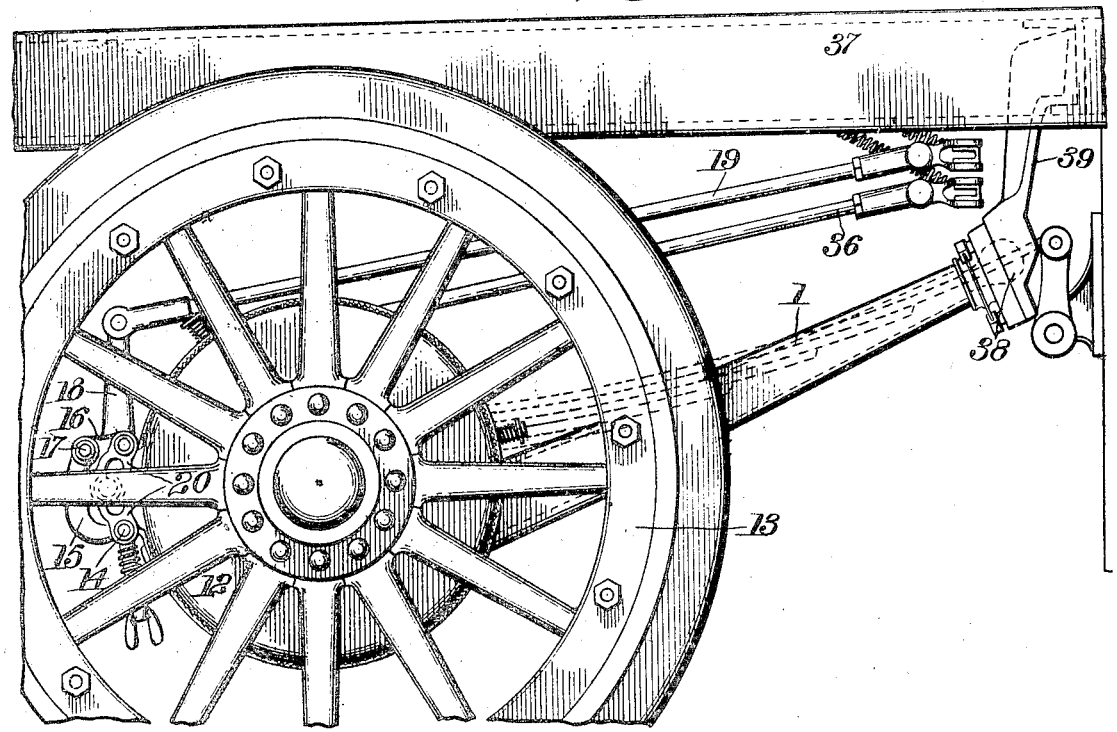

W. MacGLASHAN.
BRAKE TORQUE FRAME.
APPLICATION FILED FEB. 26, 1913.

1,102,529.

Patented July 7, 1914.

2 SHEETS—SHEET 1.

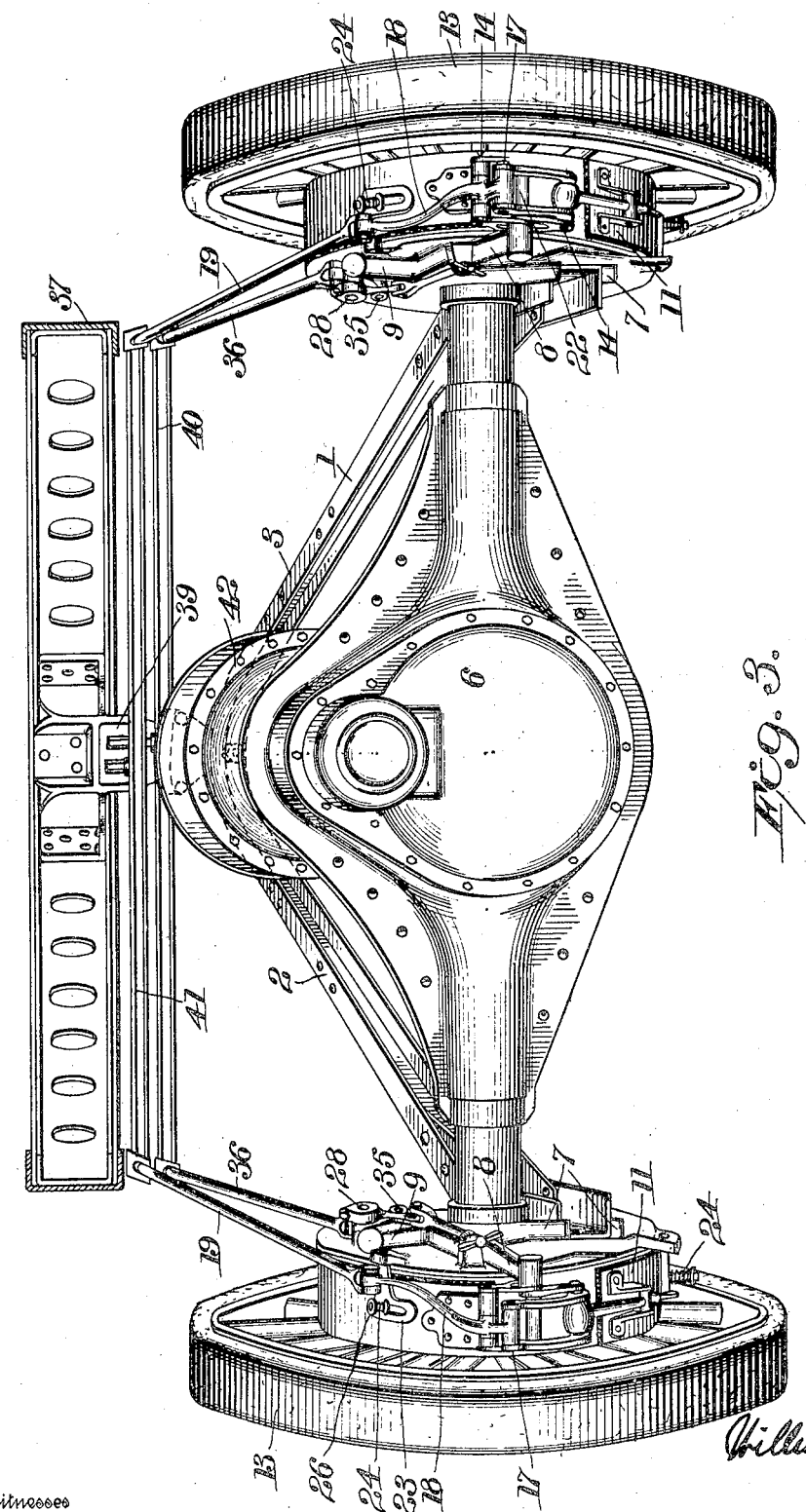

UNITED STATES PATENT OFFICE.

WILLIAM MacGLASHAN, OF SOUTH BEND, INDIANA, ASSIGNOR TO THE STUDEBAKER CORPORATION, OF SOUTH BEND, INDIANA, A CORPORATION OF NEW JERSEY.

BRAKE TORQUE-FRAME.

1,102,529.   Specification of Letters Patent.   Patented July 7, 1914.

Application filed February 26, 1913. Serial No. 750,712.

*To all whom it may concern:*

Be it known that I, WILLIAM MacGLASHAN, a citizen of the United States of America, residing at South Bend, St. Joseph county, State of Indiana, have invented certain new and useful Improvements in Brake Torque-Frames, of which the following is a specification.

This invention relates to motor vehicles and particularly to means for mounting and supporting the brake and resisting and distributing the torque which results when the brake is applied.

The motor vehicle brakes in use commonly consist of a member which rotates with the wheels and is ordinarily secured either to the rear axle or to one of the rear wheels, and means for applying friction to such rotating member. Commonly the rotating members are in the form of drums, one being secured to each rear wheel, and friction is applied thereto by means of a combination of parts supported on the rear housing. Thus the torque of the brake, *i. e.*, the reaction of the force which is exerted in stopping the machine is applied to the rear axle housing with a resulting tendency to turn the housing relatively to the frame. It is customary to connect the housing to the frame by means of springs and otherwise by means of comparatively slender thrust and tension rods which are not adapted to withstand a transverse stress. These members must receive and resist the tendency to turn the housing, and with the torque of the brake thus distributed, there is a considerable tendency to distort the springs and otherwise change the relation of the parts so that increased wear and sudden failure result.

The object of this invention is to overcome the difficulties thus recited, and to this end means is provided for supporting the brake independently of the rear axle housing and springs whereby the torque of the brake is taken up by a rigid member and transmitted by it directly to the frame of the vehicle.

The brake is supported and the torque is taken up by a rigid member which receives the torque as a transverse stress, and this member is supported on two bearings which are either pivotal or universal, one being on the housing and the other on the frame. More particularly described, the means for supporting the brake consists of a member which is mounted to swing relatively to the rear axle housing, being preferably formed to receive and fit a cylindrical portion of the housing near each end of the housing which acts as a trunnion. The member thus described forms a rigid integral torque frame which extends forward and upward, being connected at its forward end to the vehicle frame by a suitable joint which permits the torque frame to swing as the springs give and the relation of the housing to the body changes. Preferably this connection is in the form of a universal joint. The torque of the brake imparts to the torque frame a tendency to rotate about the housing, and with the frame placed as described and viewed from the right of the machine, the tendency is to righthanded rotation. The result of this tendency of the torque frame to rotate is a force which is directed downward and applied to the vehicle frame at a point beneath the center of gravity of the load.

As the whole vehicle is constructed with a view to sustaining a load or resisting a force which theoretically at least is applied at this point, it is apparent that the torque of the brake is thus most efficiently resisted. Thus the most excessive stresses which can result from the application of the brake are taken up and distributed to the parts in the form of forces which those parts are intended to resist, and therefore there is no resulting distortion of the parts or injury to the vehicle.

The frame disclosed herein is discussed in my co-pending application Serial No. 746,329, entitled motor and transmission support, filed February 5th, 1913. However, while in that instance it is described as a torque and thrust frame, its most important function in the present case in connection with the brake is that of a torque frame, and its form and construction may be widely varied within the scope of the invention.

In the accompanying drawings I have illustrated the device of my invention together with so much of a motor vehicle and brake as is necessary to a clear understanding of the device.

Figure 2:
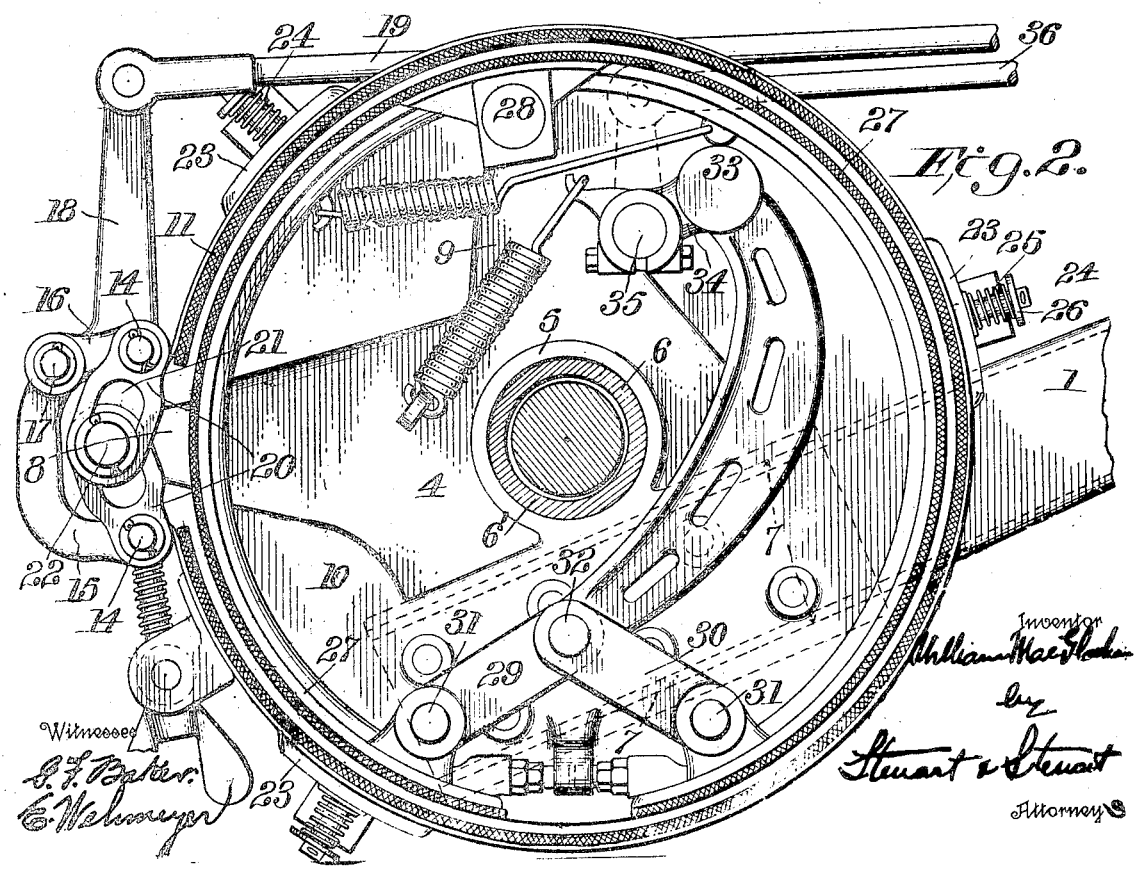

Figure 1 is a fragmentary elevation showing a portion of the frame of the vehicle, the rear wheel, the brake, drum and the torque frame. Fig. 2 is a view in side elevation showing a fragment of a torque arm, the corresponding brake disk with the brake drum removed, the external brake strap and the internal segments and band. Fig. 3 is a rear view in the nature of a perspective showing the rear axle housing, the rear wheels and the torque frame with certain portions of the brakes mounted thereon and the motor and transmission casing.

Referring to the drawings by numerals, each of which is applied to the same or equivalent parts in the different figures of the drawing, the torque frame 1 which carries the brakes and receives and distributes the torque put upon the brakes in overcoming the momentum of the vehicle, consists of two rigid members 2 and 3 which are adapted to resist a considerable transverse stress and, as shown, are in the form of channel bars. These are so placed that with the rear axle housing 6 they form a triangle of which the latter is the base. The rigid members 2 and 3 being pivotally mounted at their rear ends on the housing, one adjacent each wheel, extend forward, converge toward their forward ends where they are rigidly connected to each other and pivotally or universally connected to the frame as hereinafter described. At its rear end each of the arms 2 and 3 of the torque frame 1 is provided with a member 4 rigidly secured to the torque frame and having a central circular aperture 5 which incloses a corresponding circular portion or trunnion 6' of the housing 6. This forms the pivotal engagement of the torque frame with the housing. To receive and hold the members 2 and 3 of the torque frame, the member or bracket 4 is provided with a suitable seat 7 to which the bars are bolted or otherwise secured as shown, and to support the various brake members it is provided with radial arms 8 and 9 between and connecting which is a circular web or plate 10 concentric with the housing and shaft and with the opening 5.

As illustrated in Fig. 2, the machine is provided with two brakes, one in the form of a band brake usually operated by means of a convenient foot-lever and another ordinarily termed an emergency brake of the internal expansion type controlled by a hand-lever. The band brake consists of a band 11 of a length somewhat less than that of the circumference of the disk 12 which is secured to the rear wheels 13. This band encircles the disk and each end is connected to one of two pins 14 carried by levers 15 and 16 pivotally connected to each other at 17. Of these the lever 16 has an upright arm 18 at right angles to the arm 16 connected to the tension rod 19 which leads forward to the actuating lever. The lever 15, as shown, is bent at an angle, and the two levers 15 and 16 have a tonglike motion when actuated by the arm 18. The pins 14 also engage slotted guide arms 20 each of which has a longitudinal slot 21 engaged by a pin 22 supported on an arm 8 of the bracket 4. The band 11 is further guided and supported by means of pins 24 which pass through slotted arms 23 of the disk or bracket 14. The spiral springs 25 encircling the pins 24 and bearing against a washer 26 thereon tend to withdraw the pins and lift the band out of contact with the drum when it is released. It will thus be apparent that with the construction described when tension is applied to the rod 19, the levers 15 and 16 guided by the slotted arms 20 on the pin 22 will be closed after the manner of tongs, causing the pins 14 to approach each other and drawing the band 11 tight against the surface of the drum. The internal expansion brake consists of two segments 27 pivotally connected and supported on the bracket 4 at 28. These segments are forced apart and into contact with the inner face of the drum by means of toggle levers 29 and 30 connected one to the lower end of each segment at 31 and pivotally connected to each other at 32. The toggle member 29 is prolonged upward beyond the pivot 32 and is connected at 33 to an arm 34 which is mounted in the bracket 4 to oscillate relatively thereto. This lever 34 is provided with a second arm 35 secured to the pivot of lever 34 and extending upward, and at its upper end this arm 35 is connected to a tension rod 36 which leads forward. The tension rods of both brakes are connected at their forward ends by transverse bars 40 and 41, and these bars are suitably connected to the operating levers. The brake is supported on and the torque of the brake is taken up by the torque frame 1, and the torque thus applied to this frame is transmitted to the frame of the vehicle near the center of gravity of the load and at a point where the frame is suitably braced to take up the stresses.

In the form of the device illustrated, the torque frame 1 supports the motor 42 with its casing and the transmission with its casing, and takes up the driving thrust and rear axle torque, and applies the resultant of these forces to the vehicle at the ball and socket joint, but it is within the scope of the present invention to eliminate these additional functions and use the torque frame as a support for and a means for taking up and distributing the torque of the brake and the brake only.

It will thus be apparent that the torque frame 1, considered as related to the brake and the brake only, is in effect a radial arm pivotally mounted on the rear housing and connected to the frame at its end to transmit the tendency to rotation, which is applied to it directly, to the frame in the form of a tangential thrust, i. e., a thrust at right angles to the length of the arm. In the present instance in applying the brake, the reaction of the brake torque as transmitted to this rotating arm, imparts to it a tendency to right handed rotation as seen from the right of the vehicle. The resulting force at the forward end of the torque frame takes a downward direction, so that the stress applied to the frame is in the form of a downwardly directed force near the center of gravity of the load, and it is clearly apparent that all vehicle frames which are properly constructed must, first of all, be designed for the purpose of resisting such a force. Thus the stresses resulting from the application of the brakes are first applied to the torque frame 1 and are so distributed by it that the springs and correlated parts are entirely relieved of the twisting tendency which is the result of the brake torque when the brakes are mounted on the housing, and the stresses thus taken up by the torque frame are so distributed and transformed that they are applied to the frame at a point where it is adapted to offer the greatest resistance and in form of a force so directed that it may be resisted to the best advantage.

I have thus described a device embodying my invention specifically and in detail in order that its nature and operation may be clearly understood; however, the terms herein are used in their descriptive rather than in their specific or limiting sense and the scope of the invention is defined in the claims.

I claim—

1. In a road vehicle, an axle, a triangular torque frame connected to the axle and to the vehicle frame, a universal joint forming the latter connection, a brake carried by the torque frame and means for actuating the brake.

2. In a road vehicle, a rear axle, a triangular rigid torque member pivotally connected to the axle and to the vehicle frame at a single point near the center of gravity of the vehicle, a brake carried by the torque member, a brake drum on one wheel, and means for actuating the brake to apply friction to the drum.

3. In a road vehicle, a torque frame pivotally connected to the rear axle and having a pivotal connection with the vehicle frame at a single point near the center of gravity of the vehicle, a brake member carried by the torque frame, a coöperating rotary brake member, and means for actuating the brake.

4. In a road vehicle, a rear axle housing, wheels, a rigid torque member pivotally connected to the housing and to the vehicle frame, the latter connection being at a single point near the lateral center of the vehicle, a brake member carried by one wheel, a coöperating brake member carried by the torque frame and means for actuating the brake.

5. In a road vehicle, a rear axle housing, a rigid torque frame trunnioned on the housing and having a ball and socket connection with the vehicle frame near the center of the vehicle, a brake member carried by the torque frame, a coöperating rotary brake member, and means for actuating the brake.

6. In a road vehicle, a rear axle housing, a rigid torque frame trunnioned on the housing and having a universal connection with the frame near its center of gravity, a brake member mounted on the torque frame and a coöperating brake member mounted on one of the rear wheels.

7. In a road vehicle, a torque frame in the form of two rigid arms, each pivoted at its rear end to the rear axle, both members converging in a forward direction and connected to the frame near its center of gravity by a universal joint, a brake member mounted on the torque frame and a coöperating brake member connected to the rear wheels to rotate therewith, and means for actuating the brake.

8. In a road vehicle, a rear axle housing, a triangular torque frame pivotally connected to the housing and means for supporting the housing on the torque frame to prevent rotation thereof, a ball and socket joint connecting the forward vertex of the torque frame to the center of the vehicle frame, wheels, brake drums carried by the wheels, a brake supporting bracket carried by the torque frame, brake means thereon to engage the drum and suitable connections for operating the brake.

Signed at South Bend, Indiana this 20th day of February 1913.

WILLIAM MacGLASHAN.

Witnesses:
DAVID R. VAUGHN, Jr.,
ADOLPH COWERG.